United States Patent
Liu (10) Patent No.: US 7,877,518 B2
(45) Date of Patent: Jan. 25, 2011

(54) METHOD AND APPARATUS FOR UPDATING APPLICATIONS ON A MOBILE DEVICE VIA DEVICE SYNCHRONIZATION

(75) Inventor: Chung Liu, Los Gatos, CA (US)

(73) Assignee: Access Systems Americas, Inc., Sunnyvale, CA (US)

( * ) Notice: Subject to any disclaimer, the term of this patent is extended or adjusted under 35 U.S.C. 154(b) by 698 days.

(21) Appl. No.: 09/727,991

(22) Filed: Nov. 30, 2000

(65) Prior Publication Data

US 2002/0065939 A1 May 30, 2002

(51) Int. Cl.
G06F 15/16 (2006.01)
G06F 15/173 (2006.01)

(52) U.S. Cl. .................................. 709/248; 709/224
(58) Field of Classification Search .................. 709/205, 709/212–214, 224, 227, 238, 248
See application file for complete search history.

(56) References Cited

U.S. PATENT DOCUMENTS

| | | | | |
|---|---|---|---|---|
| 5,887,063 A * | 3/1999 | Varadharajan et al. | ...... | 713/172 |
| 6,092,196 A | 7/2000 | Reiche | ........................ | 709/221 |
| 6,202,207 B1 * | 3/2001 | Donohue | .................... | 717/173 |
| 6,505,200 B1 * | 1/2003 | Ims et al. | ........................ | 707/8 |
| 6,671,757 B1 * | 12/2003 | Multer et al. | ................ | 710/100 |
| 6,842,861 B1 * | 1/2005 | Cox et al. | .................... | 713/188 |
| 6,963,883 B1 * | 11/2005 | Creemer et al. | ............. | 707/201 |
| 7,085,822 B1 * | 8/2006 | Donatelli et al. | ............ | 709/220 |

FOREIGN PATENT DOCUMENTS

| WO | WO 00/14530 | 3/2000 |
|---|---|---|
| WO | WO 00/62576 | 10/2000 |

\* cited by examiner

Primary Examiner—Hussein A Elchanti
(74) Attorney, Agent, or Firm—Berry & Associates P.C.

(57) ABSTRACT

A method and system for the delivery of updated web platform applications to a mobile electronic device upon synchronization of the mobile device with a computer. Specifically, one embodiment of the present invention discloses a method and system for dynamically creating personalized and up-to-date applications whenever a mobile electronic device is synchronized with a stand-alone computer system that is coupled to remotely located content servers or computers via a communication network, such as the Internet. Conduits act as gateways for synchronization between the mobile electronic device and the plurality of content servers or computers. These conduits coordinate the loading of the personalized and up-to-date applications onto the mobile electronic device. In one example, a user can then access up-to-date information on the applications at a more convenient time and while disconnected from the content servers or computers that provide the information.

16 Claims, 12 Drawing Sheets

METHOD AND APPARATUS FOR UPDATING APPLICATIONS ON A MOBILE DEVICE VIA DEVICE SYNCHRONIZATION

BACKGROUND OF THE INVENTION

1. Field of the Invention

The present invention relates to the field of web based applications located on mobile devices. In one embodiment, the present invention is directed to the field of user interactions with web content via a palm-sized computer system.

2. Related Art

As the components required to build a computer system have reduced in size, new categories of computer systems have emerged. One of the new categories of computer systems is the "palmtop" computer system. A palmtop computer system is a mobile computer that is small enough to be held in the hand of a user and can therefore be "palm-sized". Palmtop computers have been known as Personal Digital Assistants (hereinafter referred to as "PDAs").

Personal Digital Assistants can be used for mobile access to the Internet using a wireless or modem connection. Users can browse and interact with various web sites over the Internet via their PDAs. To compensate for low bandwidth limitation, smaller display areas, limited memory, limited processor speeds associated with PDAs, new technologies help condense the contents of a web page to a format compatible with a PDA. The condensed web content streamlines information by minimizing text and graphics. Pertinent information is retained while extraneous information is deleted.

Web platform applications are located on a PDA and facilitate user interaction with the content servers that maintain particular web sites. A single web platform application on a PDA is supported by a particular web site on the Internet. These web platform applications are designed to interact with and facilitate the transfer of the condensed web content from a particular web site to the PDA. User interface elements integrated into the web platform application help to retrieve and display web content.

Additionally, a PDA can contain and operate many other applications that may run independently of any support application located remotely from the PDA. Further, a PDA may have applications that are supported by or are extensions of applications located remotely from the PDA, such as on a stand-alone computer system. Some typical applications are address book and calendar, where they interact with a remotely located application to import and export the exchange of data.

Web platform applications consist of static content including text, search forms, image files, links to files within the application, etc. By installing a web platform application onto a PDA, users in essence pre-select web sites that are important to the user. A host of installed web applications on a PDA can provide access to specific types of information such as stock quotes, flight schedules, restaurant listings, as well as other pieces of information while connected to the internet.

Unfortunately, users must be actively connected to the Internet when accessing information located on a particular web site. The user necessarily is present at the time of connection with the Internet when requesting information or interacting with a content server. This active monitoring is not an efficient use of a user's time particularly with the low wireless connection bandwidth typically associated with PDAs. The user must wait for the request to be formatted, be transmitted to a content server, the request to be processed, and the condensed web content to be reformatted and delivered back to the PDA.

For example, if a user is interested in the latest news, the user can connect with a news web site through a web platform application resident on a PDA. After navigating through the various links and queries, the desired information is condensed and sent back to the user's PDA. Depending on the size of the file, additional time is needed to download the condensed web content. Further, if the PDA runs out of power at any time during the transaction, the user cannot access the information and must restart the process after re-powering the PDA. Thus, a need exists to provide a more efficient way to using web applications to interact with content servers.

Additionally, web platform applications may become permanent legacies on a user's PDA unless the user chooses to update that particular web platform application. Even if a newer version of a web platform application contains unique and desirable features, many users will not take the time and trouble to update the web platform application. Noting its static nature, web platform applications are designed to last for the useable lifetime of a PDA. Therefore, a web site must have the capability to support newer as well as older versions of their web platform applications in order to maintain customer satisfaction. Thus, a need exists to provide a better way to support web platform applications.

Web platform applications typically are generalized to appeal to a broad cross-section of users. Because of its general nature, a user may need to navigate through a number of pages both within the web platform application located on the user's PDA and possibly on the web site before viewing any desired information. The user through-rate becomes more critical the greater number of pages a user navigates through to retrieve information. Through-rates of as high as fifty percent are estimated such that web sites lose up to fifty-percent of viewers at each new page in a navigational sequence. Thus, it would be advantageous to provide a better way to retain more viewers of a particular web site.

SUMMARY OF THE INVENTION

The present invention provides a method and system for the updating of applications located on a mobile device by synchronizing the mobile device with a host stand-alone computer. The present invention provides a more efficient way for web platform applications to interact with content servers through synchronization. The present invention also provides a better way for content servers to support web platform applications since web platform applications can be updated. Also, the present invention provides a way to personalize the web platform application in order to retain more viewers of a particular web site.

These and other objects and advantages of the present invention will no doubt become obvious to those of ordinary skill in the art after having read the following detailed description of the preferred embodiments which are illustrated in the various drawing figures.

Specifically, a method and system for the delivery of updated web platform applications to a mobile electronic device upon synchronization of the mobile device with a host computer is described. Personalized and up-to-date applications are dynamically created whenever a mobile electronic device is synchronized with a stand-alone computer system that is coupled to remotely located content servers or computers via a communication network, such as the Internet. Conduits act as gateways for synchronization between the mobile electronic device and the plurality of content servers or computers. These conduits coordinate the loading of the personalized and up-to-date applications onto the mobile electronic device. A user can then access up-to-date information on the applications at a more convenient time and while disconnected from the content servers or computers that provide the information.

In one embodiment, a conduit program associated with a specific web platform application coordinates the updating of the web platform application. When a mobile device synchronizes with a host computer system, the conduit establishes communication between the host computer system and the content server that supports that web platform application. The conduit determines if the web platform application on the mobile device is the most current version offered by the content server. If outdated, the conduit coordinates the downloading of the most current version of the web platform application from the content server to the mobile device. A user can then access information on the web platform application at a more convenient time.

In another embodiment, the content server dynamically creates the most current version of the web platform application and personalizes the application to the user.

DETAILED DESCRIPTION OF THE INVENTION

Reference will now be made in detail to the preferred embodiments of the present invention, a method and system for the updating of applications via device synchronization, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a screen. One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a stand-alone computer system, enabling the two devices to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

Figure 1A:
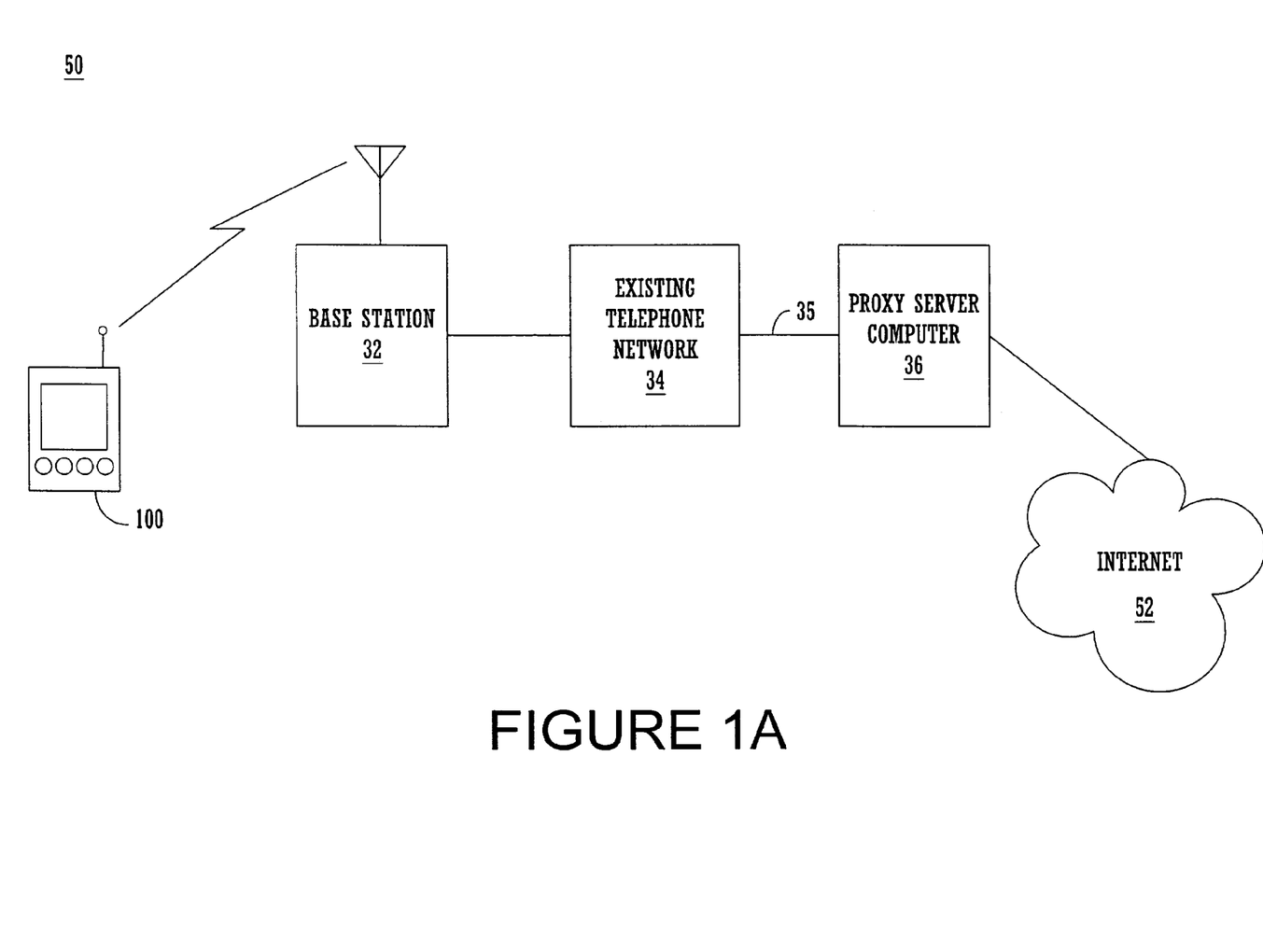
FIG. 1A illustrates a block diagram of a first exemplary network environment including a personal digital assistant in accordance with an embodiment of the present invention.

FIG. 1A is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 1B:
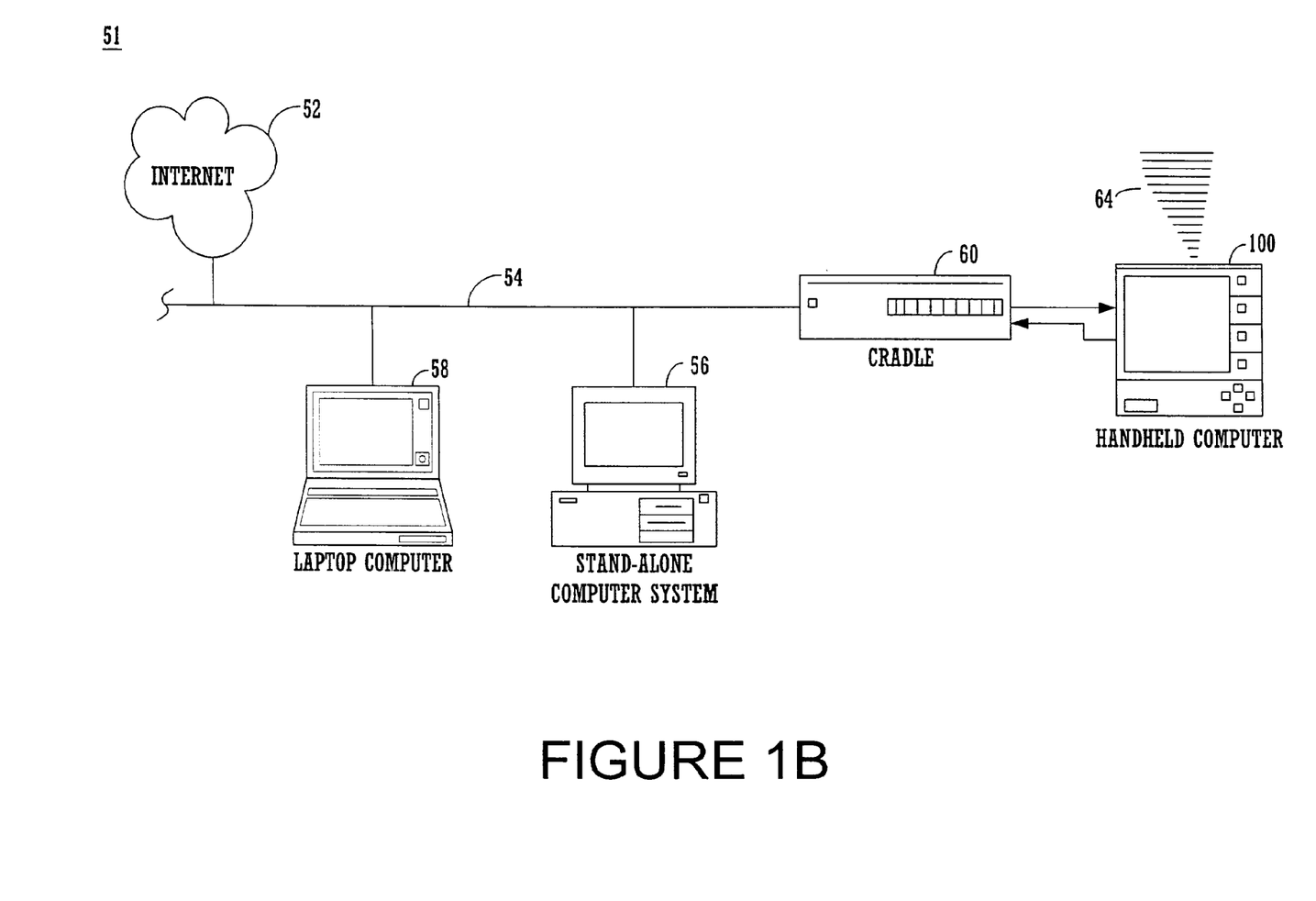
FIG. 1B illustrates a block diagram of a second exemplary network environment including a personal digital assistant coupled to other computer systems and the Internet via a cradle device in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54 such as content servers on Internet 52) and the PDA 100 for two way communications. The PDA 100 also contains a wireless infrared communication mechanism 64 (e.g., an infrared emitter and detector device) for sending and receiving information from other similarly equipped devices (see FIG. 1B).

With reference to FIGS. 1A and 1B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

Figure 2A:
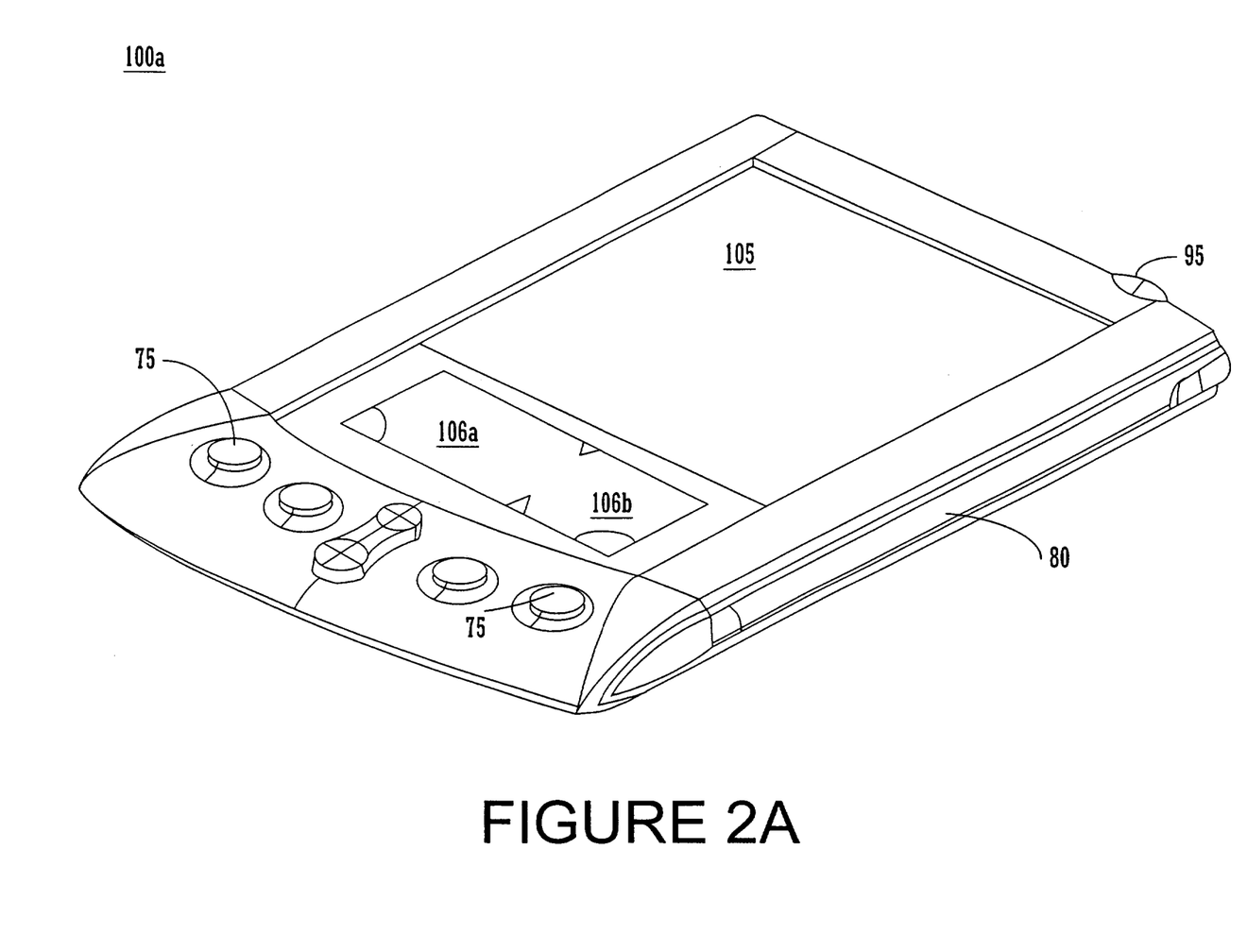
FIG. 2A is a top side perspective view of a palmtop computer system that can be used as a platform for the data entry and authentication embodiments of the present invention.

FIG. 2A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
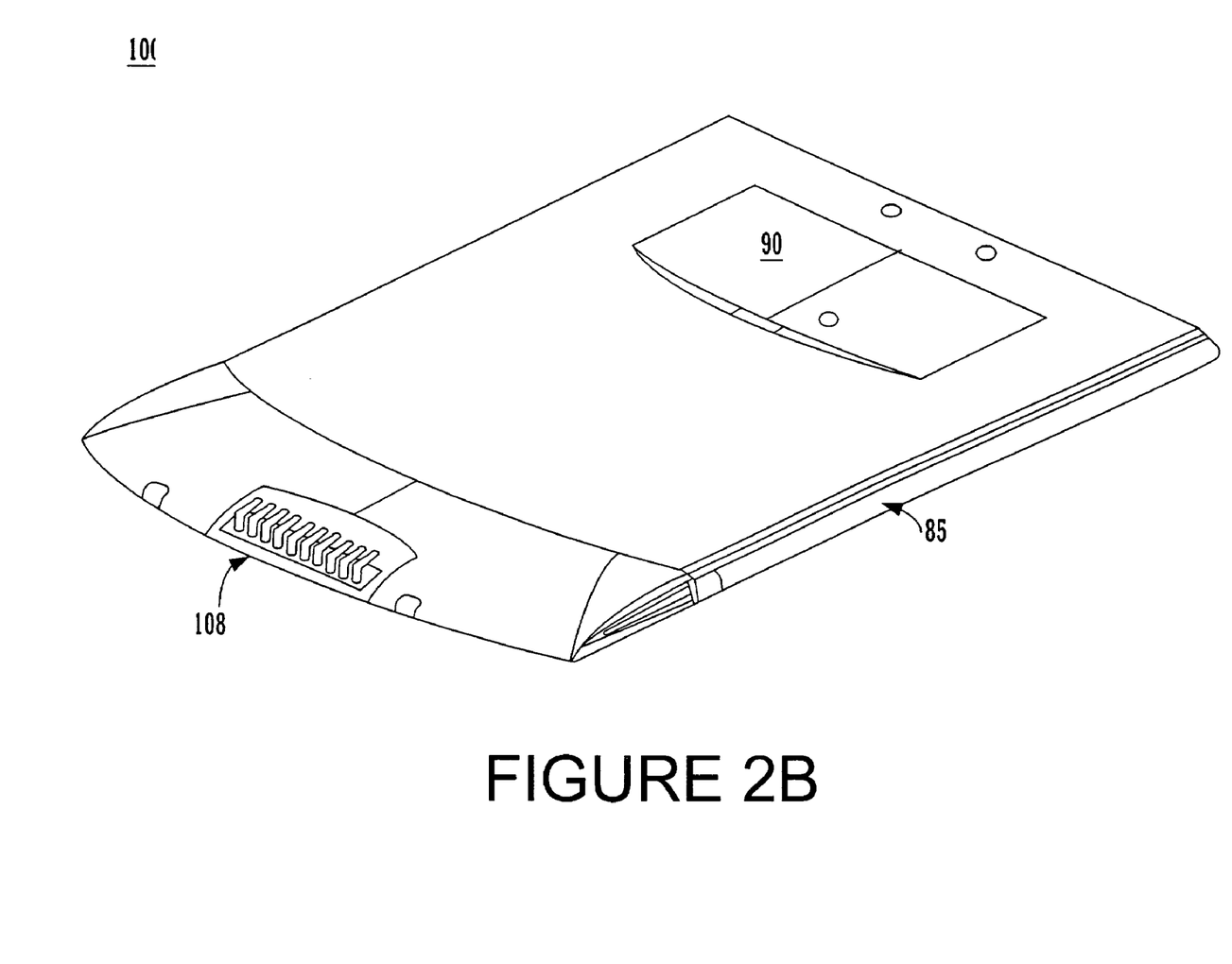
FIG. 2B is a bottom side perspective view of the palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
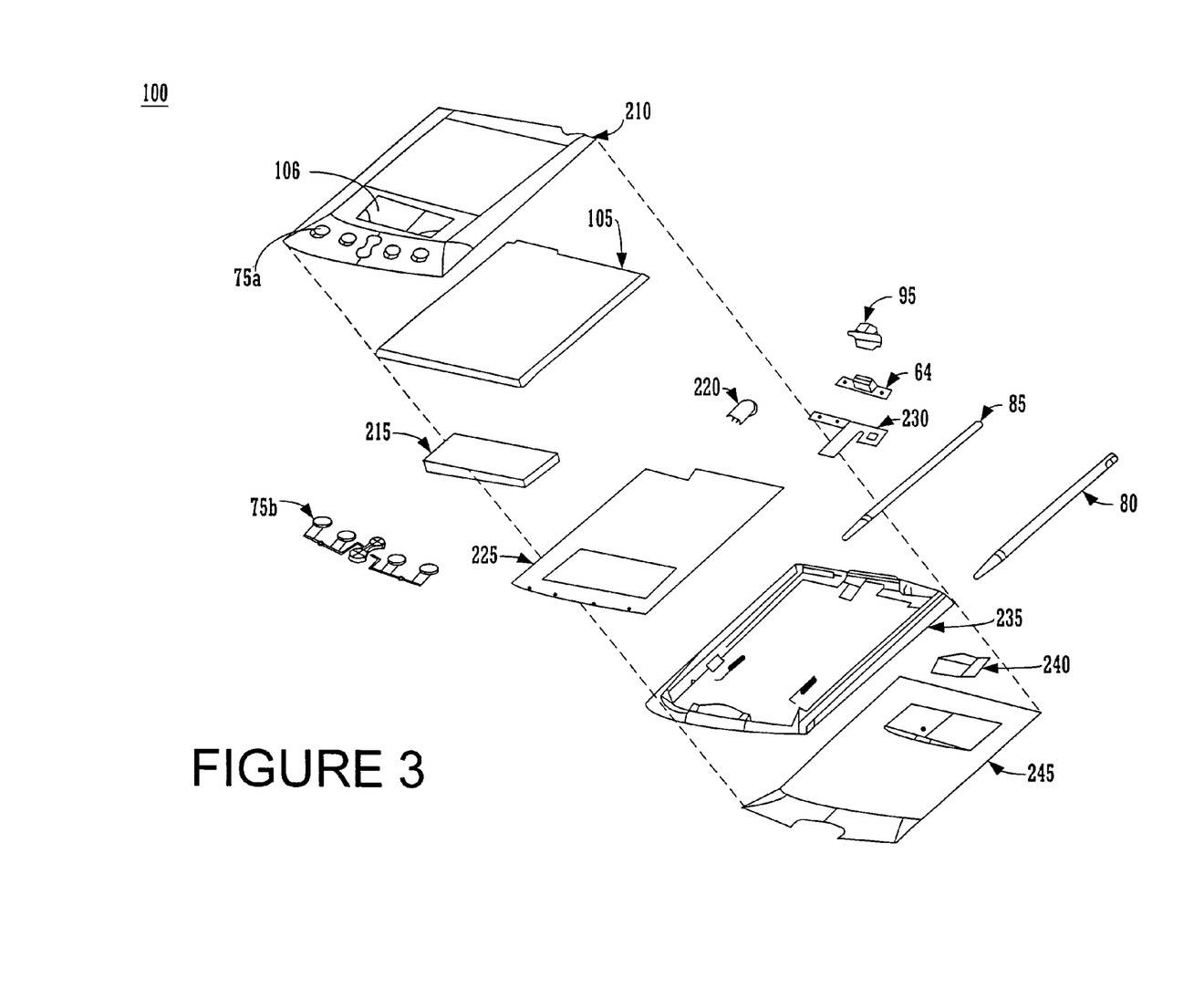
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
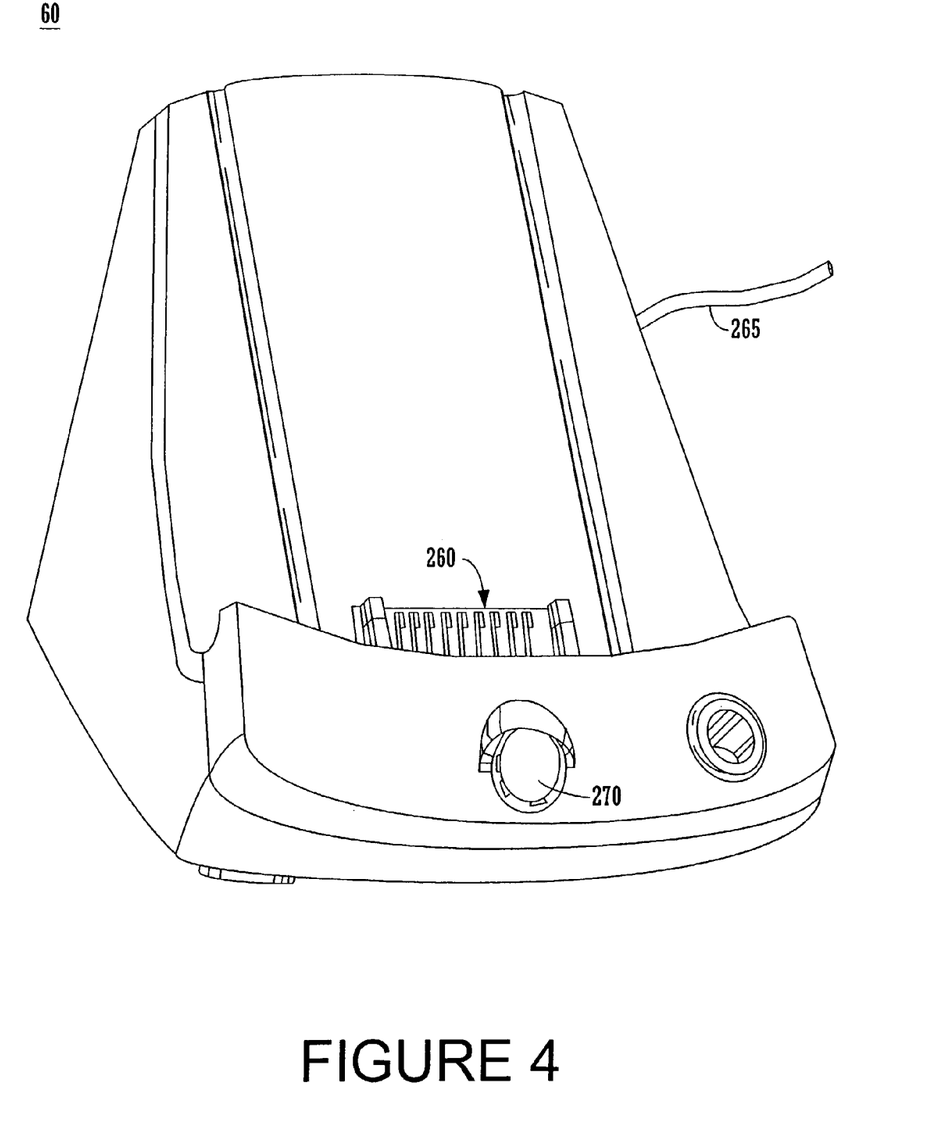
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 5:
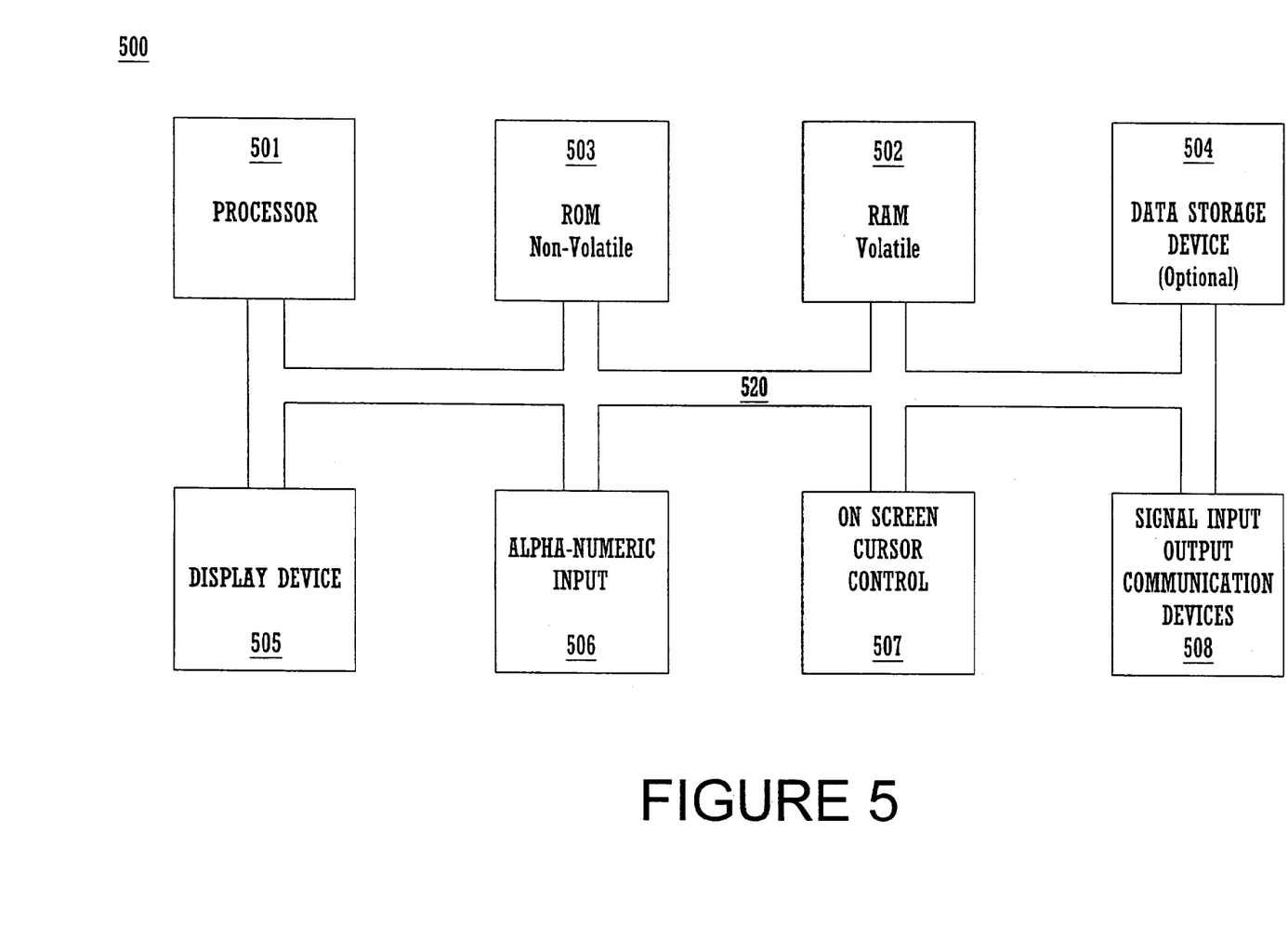
FIG. 5 is a logical block diagram of the palmtop computer system in accordance with an embodiment of the present invention.

Referring now to FIG. 5, portions of the present electronic system are comprised of computer-readable and computer-executable instructions which reside, for example, in computer-readable media of an electronic system (e.g., personal digital assistant, computer system, and the like). FIG. 5 is a block diagram of exemplary interior components of an exemplary electronic device, an example of which is personal digital assistant 100, upon which embodiments of the present invention may be implemented. It is appreciated that the exemplary PDA 500 of FIG. 5 is only exemplary and that the present invention can operate within a number of different electronic systems including general purpose networked computer systems, embedded computer systems, and stand-alone electronic systems such as a cellular telephone or a pager.

FIG. 5 illustrates circuitry of an exemplary electronic system or computer system 500 (such as the personal digital assistant), some of which can be implemented on PC board 225 (FIG. 3). Exemplary computer system 500 includes an address/data bus 520 for communicating information, a central processor 501 coupled with the bus 520 for processing information and instructions, a volatile memory 502 (e.g., random access memory (RAM), static RAM dynamic RAM, etc.) coupled with the bus 520 for storing information and instructions for the central processor 501 and a non-volatile memory 503 (e.g., read only memory (ROM), programmable ROM, flash memory, EPROM, EEPROM, etc.) coupled to the bus 520 for storing static information and instructions for the processor 501. Exemplary computer system 500 also includes an optional data storage device 504 (e.g., memory card, hard drive, etc.) coupled with the bus 520 for storing information and instructions. Data storage device 504 can be removable. As described above, exemplary computer system 500 also contains an electronic display device 505 coupled to the bus 520 for displaying information to the computer user. In one embodiment, PC board 225 (FIG. 3) can contain the processor 501, the bus 520, the ROM 503 and the RAM 502.

Also included in computer system 500 of FIG. 5 is an alphanumeric input device 506 which in one implementation is a handwriting recognition pad ("digitizer") having regions 106a and 106b (FIG. 2A), for instance. Device 506 can communicate information (spatial data and pressure data) and command selections to the central processor 501. System 500 also includes an optional cursor control or directing device 507 coupled to the bus for communicating user input information and command selections to the central processor 501. In one implementation, device 507 is a touch screen device incorporated with display 505. Device 507 is capable of registering a position on the display 505 where the stylus makes contact and the pressure of the contact. The display device 505 utilized with the computer system 500 may be a liquid crystal device, cathode ray tube (CRT), field emission device (FED, also called flat panel CRT) or other display device suitable for creating graphic images and alphanumeric characters recognizable to the user. In the preferred embodiment, display 505 is a flat panel display.

With reference still to FIG. 5, exemplary computer system 500 also includes a signal input/output device 508 which is coupled to bus 520 for providing a communication link between computer system 500 and a network environment (e.g., network environment 50 and 51 of FIGS. 1A and 1B respectively). As such signal input/output device 508 enables central processor unit 501 to communicate wirelessly with other electronic systems coupled to the network. It should be appreciated that within the present embodiment, signal input/output device 508 is coupled to antenna 85 and provides the functionality to transmit and receive information over a wireless communication interface. It should be further appreciated that the present embodiment of signal input/output device 508 is well-suited to be implemented in a wide variety of ways. For example, signal input/output device 508 could be implemented as a modem. Further, signal input/output communication device 508, also coupled to bus 520, can be a serial port for communicating with the cradle 60. Additionally, device 508 can also include an infrared communication port.

Web Platform Applications

Figure 6:
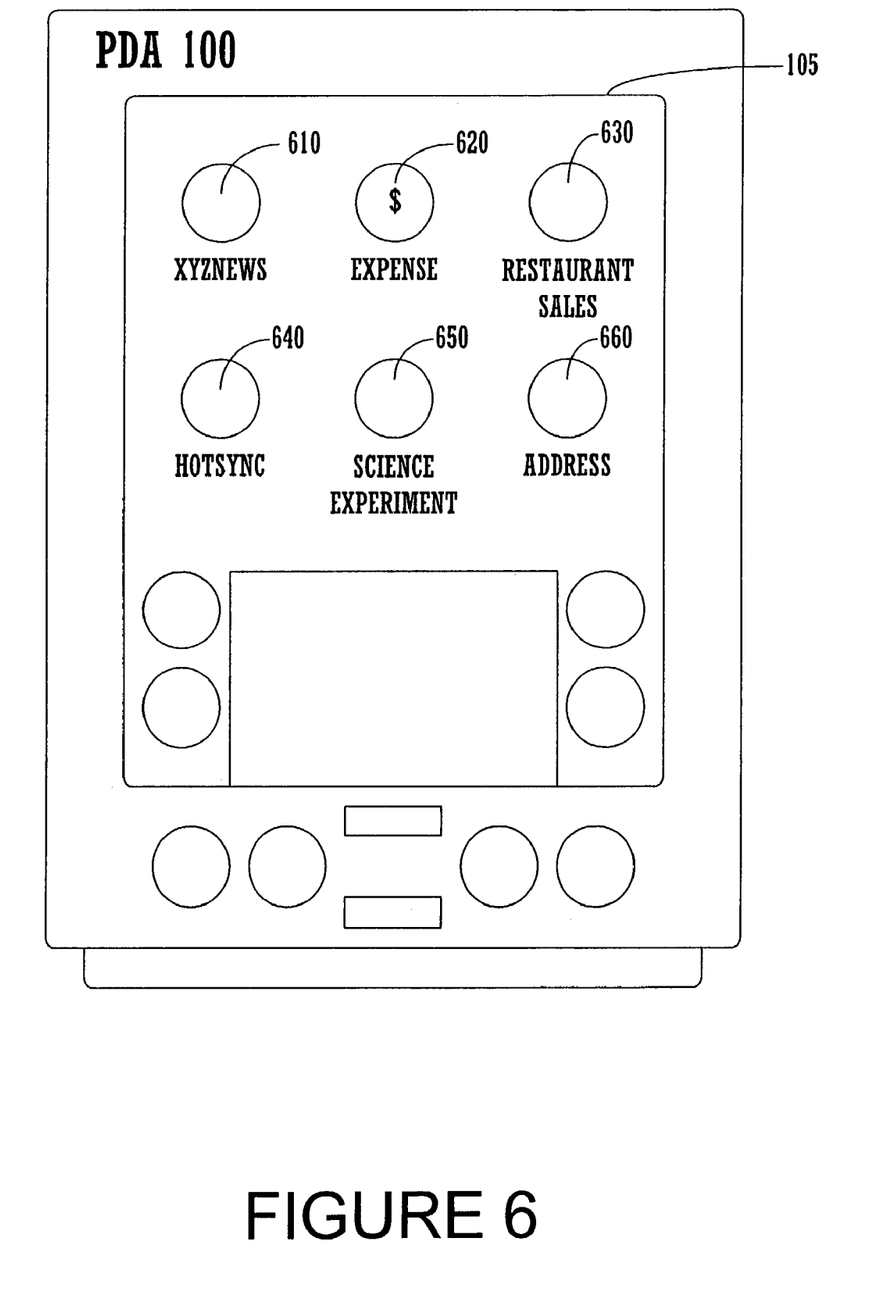
FIG. 6 is a front view of a palm top computer system illustrating the display screen, and a generalized form of launching icons associated with applications resident on a personal digital assistant.

A method and system are described utilizing web platform applications and applications in general. Applications resident on a personal digital assistant 100 are software programs that can run independently, or can be extensions of and supported by corresponding applications located on remote computer systems. Web platform applications are commonly known as web clipping applications, an example of which is a palm query application. FIG. 6 shows the front face of a personal digital assistant 100. Launching icons representing applications 610, 620, 630, 640, 650, and 660 that are resident on PDA 100 are shown on display 105.

Applications on PDA 100 can be extensions of corresponding applications located on a remote stand-alone computer system. For example, through synchronizing the PDA 100 with a stand-alone computer system, the address book application 660 and restaurant sales application 630 shown in FIG. 6 can exchange data with and be supported by the corresponding applications located on a stand-alone computer system, such as system 56 in FIG. 1B. The process of synchronization is described in more detail in the following three U.S. patents which are hereby incorporated by reference: U.S. Pat. No. 5,727,202 entitled "Method and Apparatus for Synchronizing Information on Two Different Computer Systems", issued Mar. 10, 1998; U.S. Pat. No. 5,832,489 entitled Method and Apparatus for Synchronizing Information on Two Different Computer Systems", issued Nov. 3, 1998; U.S. Pat. No. 6,006,274 entitled "Method and Apparatus using a Pass Through Personal Computer Connected to Both a Local Communication Link and a Computer Network for Identifying and Synchronizing a Preferred Computer with a Portable Computer", issued Dec. 21, 1999.

Additionally independent programs such as games or the expense application 620 may run independently of any remote support application. A simple expense application 620 might track the daily expenses of a user.

An example of a web platform application in FIG. 6 that is supported by a content server, that maintains a specific web site, is the XYZNEWS application 610. A user can use XYZNEWS application 610 to interact with the XYZNEWS content server to access information about the latest breaking news. In general, web platform applications facilitates user interaction with content servers associated with those applications. The web platform application contains user-interface elements that retrieves, updates, and displays content on a PDA 100. A host of installed web applications on PDA 100 can provide access to specific types of information such as stock quotes, flight schedules, restaurant listing, as well as other pieces of information while connected to the Internet. Additionally, a web platform application can facilitate user interaction with a content server by having a user fill out query forms located on a web platform application while disconnected from the Internet. Subsequently, the forms are sent out for processing the next time the PDA 100 is synchronized with a host computer system, such as system 56 in FIG. 1B.

Science experiment application 650 in FIG. 6 represents an application that is an extension of a corresponding application located on a stand-alone computer system, such as system 56 in FIG. 1B, that can be directly accessed and need not be supported through the Internet.

The HotSync application 640 of FIG. 6 assists in the synchronization of data between PDA 100 and a stand-alone computer system, such as system 56 in FIG. 1B. For example, data stored in PDA 100 associated with address book application 660 can be synchronized with data associated with a corresponding address book application on the stand-alone computer system 56.

Updating Applications on a Mobile Device Via Device Synchronization

Although the description of one embodiment of the present invention will focus on an exemplary personal digital assistant (hereinafter referred to as "PDA") or palmtop computer system, embodiments of the present invention can be practiced with other electronic systems or electronic devices (e.g. personal computer systems, cellular phones, pagers, portable web devices, etc.).

Figure 7:
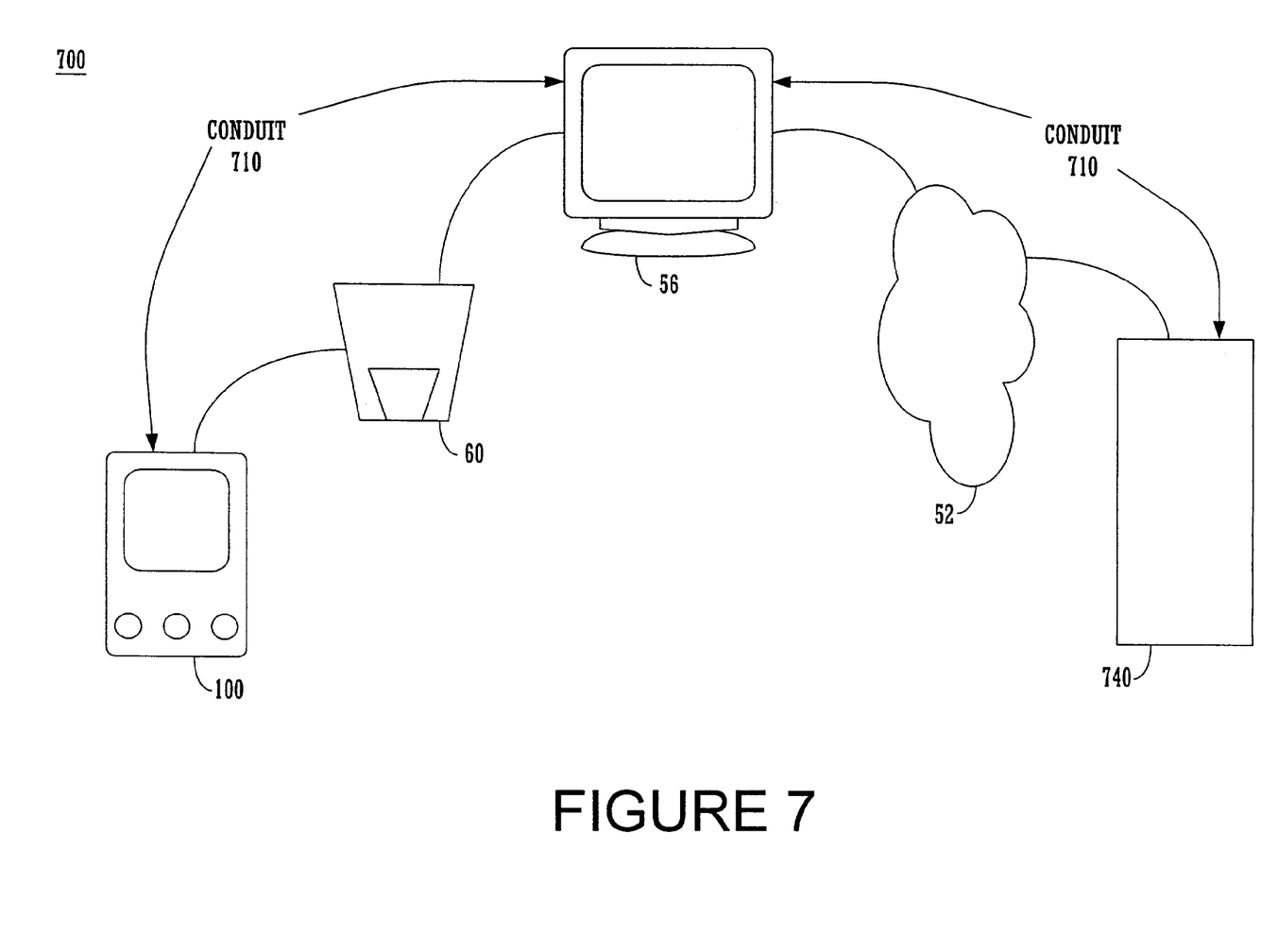
FIG. 7 illustrates a block diagram of an exemplary network environment showing the conduit as a gateway between a content server and a personal digital assistant in accordance with an embodiment of the present invention.

FIG. 7 shows an exemplary network configuration 700 in one embodiment of the present invention. It is appreciated that network 700 is similar to the network 51 in FIG. 1B. System 700 comprises a host computer system 56 that is coupled to a cradle 60 for receiving and initiating communication with a personal digital assistant 100. Host computer system 56 is also coupled to a communication network such as the Internet 52. A content server 740 that maintains a particular web site is also coupled to Internet 52.

In one embodiment of the present invention, conduit programs are resident on host computer system 56. During synchronization, conduit programs are activated to maintain data pipelines between host computer 56 and PDA 100 during synchronization. The conduits act as gateways between the two devices to drive the data synchronization between PDA 100 and the host computer 56. Each conduit is assigned to each unique pair of corresponding applications on the host computer system and PDA 100. Conduits are described in more detail and are described in the following patents which are hereby incorporated by reference: U.S. Pat. No. 6,000,000 entitled "Extendible Method and Apparatus for Synchronizing Multiple Files on Two Different Computer Systems", issued May 4, 1998; and U.S. Pat. No. 5,884,323 entitled "Extendible Method and Apparatus for Synchronizing Files on Two Different Computer Systems", issued Mar. 16, 1999.

The address book application 660 of FIG. 6 and its corresponding address book application on host computer 56, for example, uses a conduit to facilitate the transfer and exchange of data between the two devices. In addition, a conduit program can install applications onto PDA 100 such that third party applications or after market applications can be brought to PDA 100. Further, the conduit is able to convert data into a format compatible with PDA 100 from other formats used by other data-handling applications.

Additionally, the conduit 710 in FIG. 7 that is resident on host computer 56 facilitates communication between PDA 100 and a content server 740 in one embodiment of the present invention. In essence it is the gateway for communication between PDA 100 and content server 740. The conduit 710 is associated with a particular application on PDA 100, such as the XYZNEWS application 610 of FIG. 6. Content server 740 maintains the web site that supports XYZNEWS application 610. Upon synchronizing PDA 100 with host computer 56 in network 700, conduit 710 is able to coordinate the updating of the XYZNEWS application 610 and loading of the updated version of XYZNEWS application 610 onto PDA 100. A user of PDA 100 can then access the information, the latest news, on XYZNEWS at a more convenient time and while PDA 100 is disconnected from Internet 52.

In one instance, a user comes into the office and begins synchronization of PDA 100 with the host computer system 56. The user need not actively monitor the synchronization process. Conduits associated with each application on PDA 100 will perform data synchronization and the updating of each of the applications. Since the user at a more convenient time can access the applications and the information contained therein, such as XYZNEWS application 610 in the previous paragraph, the user is free to do other activities and is not forced to wait for the information to be downloaded onto the PDA 100. This provides an efficient way to interact with one or more web sites since the information contained within those web sites are downloaded to the PDA 100 at one sitting and without any monitoring by the user.

In another embodiment of the present invention, the conduit on the host computer system actively searches for an updated or newer application associated with that conduit over a communication network, such as the Internet. The search is conducted while the personal digital assistant is not coupled to the host computer system. If the conduit finds an updated or newer application than the application presently on the PDA, then the content server or stand-alone computer system associated with the application sends the updated or newer application for loading into memory located in the host computer system. The next time a synchronization process is conducted between the PDA and the host computer, the updated or newer application is downloaded to the PDA. The version of the application previously resident on the PDA is replaced with the updated or newer application.

Figure 8:
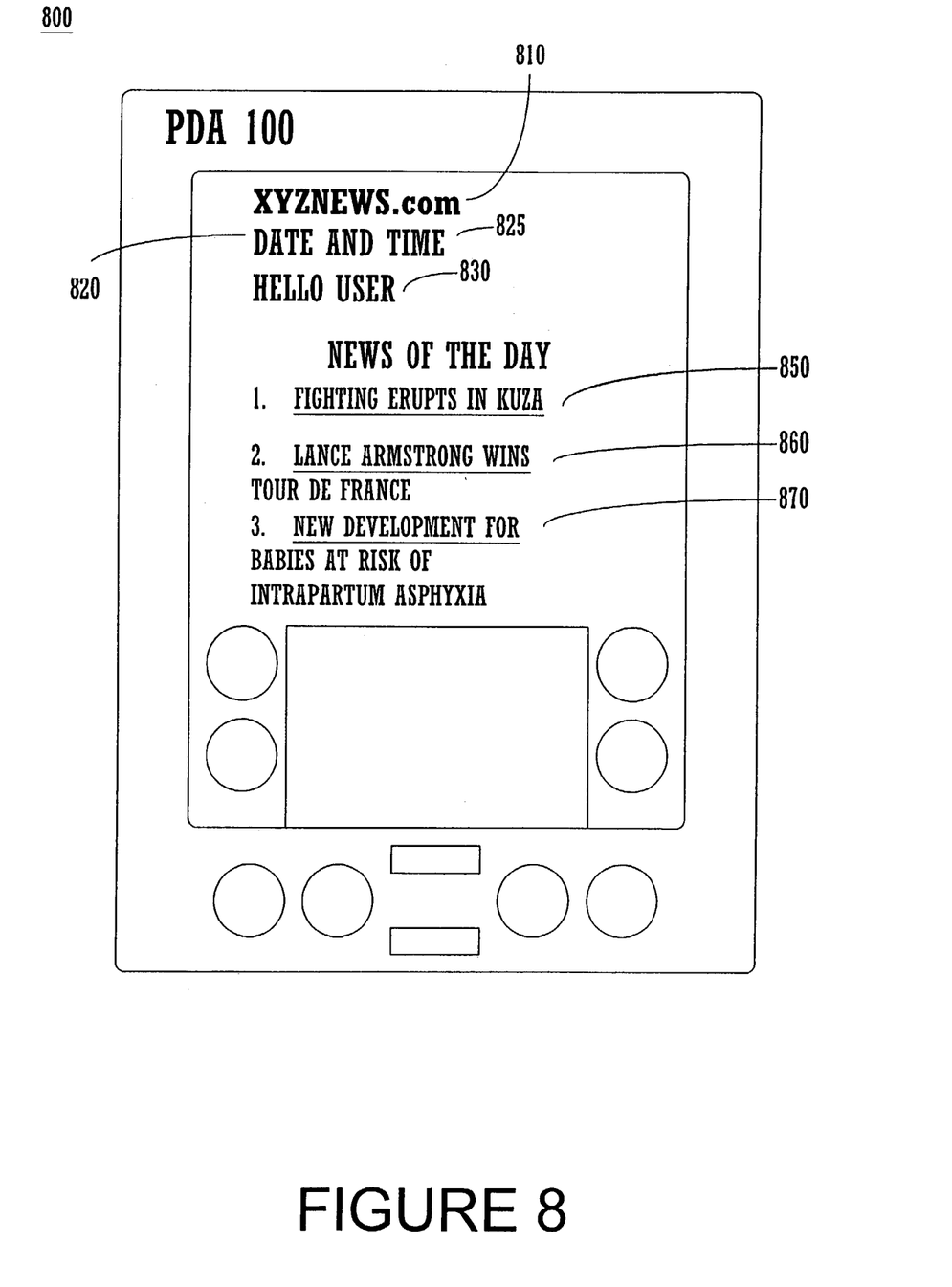
FIG. 8 illustrates a front view of a palm top computer system illustrating the front page of a web platform application in accordance with an embodiment of the present invention.

FIG. 8 illustrates the front page 800 of XYZNEWS application 610. It is appreciated that the FIG. 8 is a generalization of web platform applications. The XYZNEWS application 610 has been updated during a synchronization process between PDA 100 and a host computer system, such as host computer 56 in FIG. 1B. Items beyond news can be contained within the XYZNEWS application 610 such as forms for purchasing, questionnaires, pictures, links to other applications, etc.

The title 810 of the web site supporting XYZNEWS application 610 is displayed in FIG. 8 along with the time 825 and date 820. The leading news stories along with links 850, 860, and 870 to those stories are also displayed. The XYZNEWS application 610 can be multiple pages that contain further links to other leading news stories and files that are compiled onto the XYZNEWS application itself. These files can contain static content such as the news stories, image files to go with the news stories, and search forms for user interaction with the web site. Since XYZNEWS chooses to put its news stories directly onto the XYZNEWS application 610, one embodiment of the present invention provides a means for updating of the news stories with limited interaction by the user just by synchronizing the PDA 100 to a host computer.

In another embodiment of the present invention, any application on a PDA 100 is capable of being updated via device synchronization using that application's conduit. For example, a mortgage lender may have an application that contains forms to fill out in order to see if a buyer qualifies for a mortgage loan. If the mortgage company wants to modify any of the forms, or to add new forms, or delete old forms, or to add new features to its web platform application, every time a synching operation is performed by a user of that mortgage company's application that user's conduit will facilitate the transfer of the newest version of the mortgage application through a communication network as in FIG. 7.

Additionally, in still another embodiment of the present invention, an application may be updated through a direct connection that does not include any Internet connection. For example, science experiment 650 in FIG. 6 represents an application that is an extension of a corresponding application located on a stand-alone computer system, such as host computer 56 in FIG. 1B, or another remotely located computer system. Tabulation of results from an experiment may require two to three days of execution. Science experiment application 650 can be used to access the real-time results of the experiment. Upon synchronization, the conduit associated with science experiment application 650 will update the application to contain the most current tabulated results. Further, graphs illustrating the results could be made if the web application developer so chooses that also could be included within the science experiment application 650.

Another example of an application that is updated through device synchronization in one embodiment of the invention without connecting to the Internet is the restaurant sales application 630 of FIG. 6. Sales of menu items can be recorded on a stand-alone computer located at a restaurant. A corresponding application to the sales application 630 is resident on the stand-alone computer and directs the recordation of such items as total monthly sales, specific menu item sales, cost of menu items, etc. A user can access those results by synchronizing a PDA containing the sales application 630 to the stand-alone computer located at the restaurant. A conduit resident on the stand-alone computer facilitates the updating of the sales application 630 such that the latest version of the sales application 630 that contains the most current sales results is downloaded to the PDA and replaces the previous version of the sales application 630.

Figure 9:
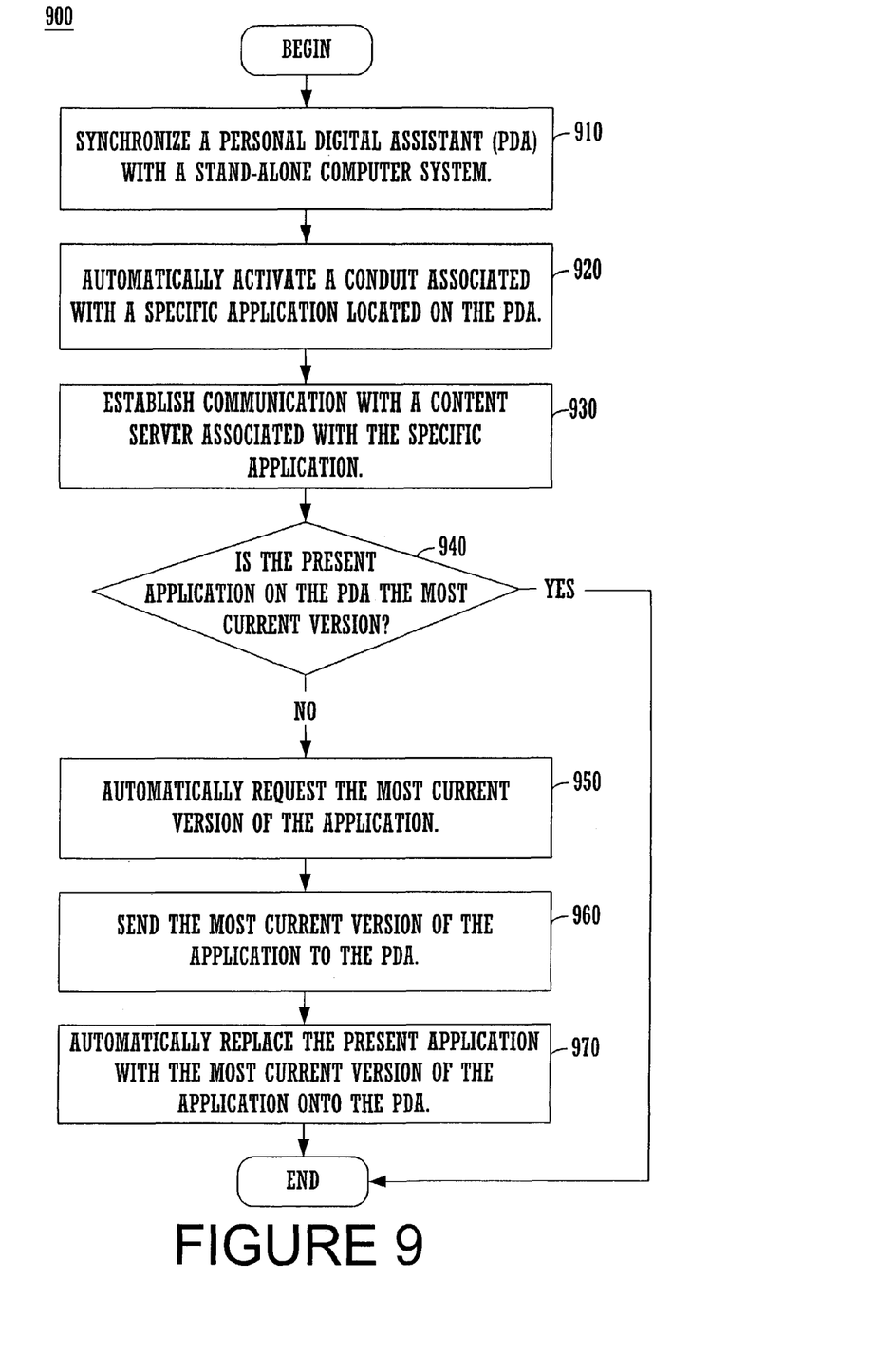
FIG. 9 illustrates a flow diagram illustrating steps in a computer implemented method for updating web platform applications via device synchronization in accordance with an embodiment of the present invention.

FIG. 9 illustrates an exemplary data flow diagram of process 900 for updating applications on a personal digital assistant via device synchronization using conduit programs, in one embodiment of the present invention. In step 910, a PDA, such as PDA 100, is synchronized to a host computer, such as host computer 56 in FIG. 1B. A conduit program associated with a specific application on PDA 100 is automatically activated upon synchronization of PDA 100 in step 920. The conduit program then automatically establishes communication with the content server that maintains the web site associated with the specific application in step 930. This communication can be over an Internet communication network or through a direct link to the content server, such as the case when the content server is the host computer 56. It is appreciated that in one embodiment of the present invention, conduits are capable of updating all types of applications resident on PDA 100 and whether their corresponding support applications are accessed via a direct link, wireless link, or through a communication network including the internet.

In step 940 of FIG. 9, the conduit determines if the present application on the PDA 100 is the most current version. This entails in one embodiment of the present invention, communicating with the content server and the PDA 100 to determine which version of the application is located on the PDA and the content server and comparing the two versions. If the present application is not the most current version, then the conduit in step 950 communicates a request to the content server for the most current version. In step 960, the content server sends the most current version of the application to the PDA 100. In step 970, the conduit automatically replaces the present application on the PDA 100 with the most current version of the application.

On the other hand, in step 940 of FIG. 9, if the present application is the most current version, then the procedure outlined in process 900 is completed. Precious bandwidth is saved by not sending a version of the application that already exists on the PDA. This opens bandwidth for other applications that need to be updated.

In another embodiment of the present invention, the content server dynamically creates a personalized and up-to-date version of the web platform application, or any application in general. After step 940 of process 900, when the conduit associated with the web platform application determines that present application is capable of being updated, the conduit coordinates the communication of identifying information about the user of the web platform application to the content server in step 943 of process 1000 in FIG. 10. It is appreciated that the content server may be a stand-alone computer system that is accessed directly, wirelessly, or through the internet. In step 945, the content server accesses information about the user from databases available to the content server. This information may include such items as name, address, and other personal information that is gained through previous interactions with the user, through data mining techniques, or other data gathering techniques. In step 947, the content server dynamically creates a personalized and up-to-date web platform application. The process 1000 then proceeds to step 960 in FIG. 9.

Referring back to FIG. 8, the XYZNEWS application 610 is personalized to the user, in one embodiment of the present invention. For example, line 830 shows a greeting to the user "Hello User." Further, by virtue of data mining techniques and previous interaction with the user, the content server associated with XYZNEWS application 610 knows that the user is specifically interested in various topics including the following: the country Kuza, the sport of bicycling, and medical developments in the area of Intrapartum Asphyxia. Previously, the user may have requested that the XYZNEWS application 610 be limited to these various topics of interest, or may have linked to these topic areas numerous times. Thus, when a user pulls up the front page 810 of XYZNEWS application 610, the user receives a personalized and up-to-date application.

Current news that are important to the user are displayed on the front page 800 of FIG. 8, such as the following: news about Kuza using link 850, news about the Tour de France using link 860, and news about Intrapartum Asphyxia using link 870. Since the stories important to the user are placed on the front page, the user need not browse through all the latest news to check for three aforementioned topics. Not only is the user more satisfied with the application 610 and the company associated with application 610, but the through rate may increase for all the customers to that particular web site associated with the XYZNEWS application 610.

Figure 10:
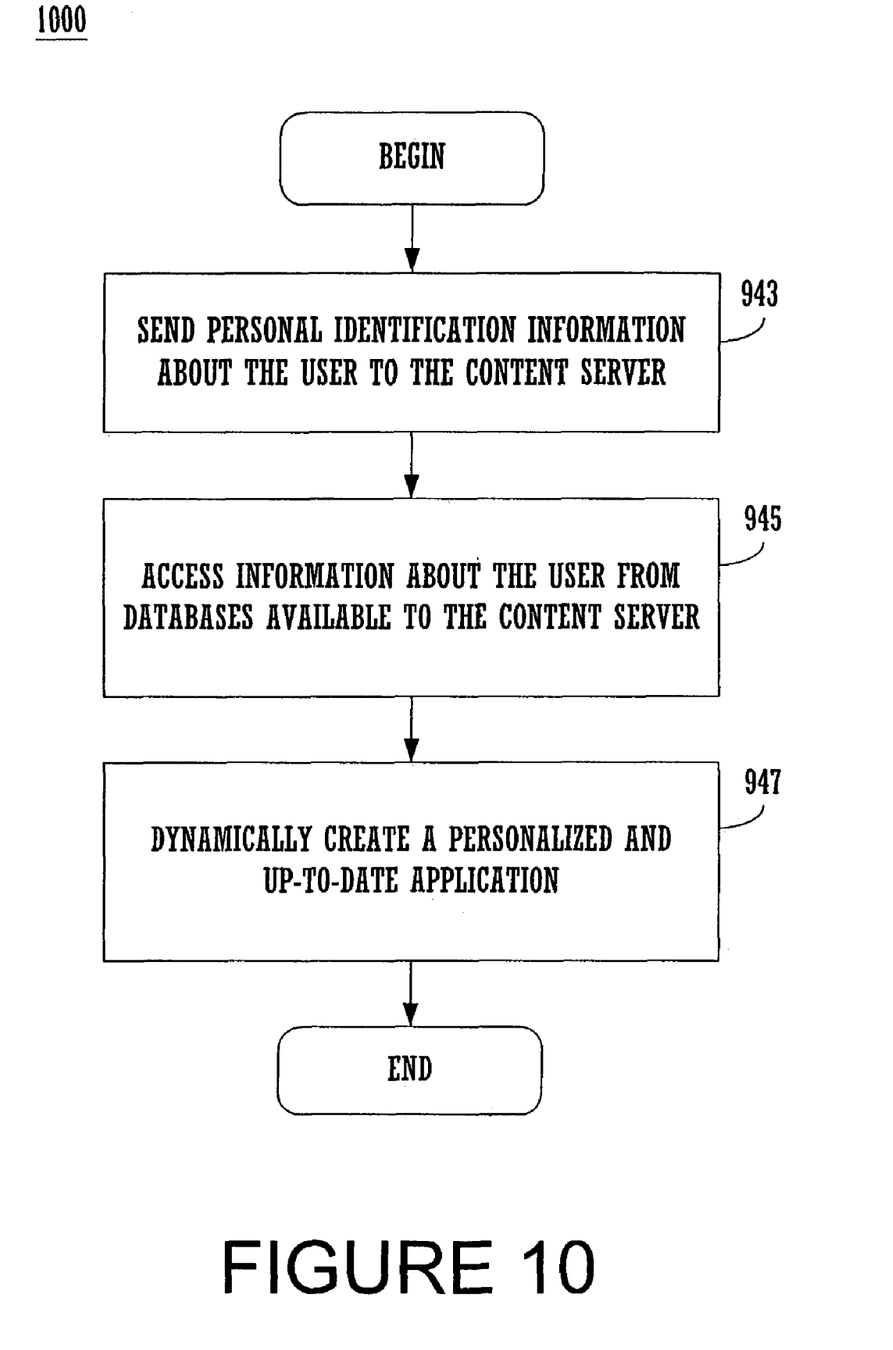
FIG. 10 is a flow diagram illustrating steps in a computer implemented method for creating a personalized and up-to-date web-platform application in accordance with an embodiment of the present invention.

While the methods illustrated in processes 900 and 1000 of embodiments of the present invention show specific sequences and quantity of steps, the present invention is suitable to alternative embodiments. For example, not all the steps provided for in the method are required for the present invention. Furthermore, additional steps can be added to the steps presented in the present embodiments. Likewise, the sequence of steps can be modified depending upon the application.

The preferred embodiment of the present invention, a method and system for updating application resident on a personal digital assistant via device synchronization, is thus described. While the present invention has been described in particular embodiments, it should be appreciated that the present invention should not be construed as limited by such embodiments, but rather construed according to the below claims.

What is claimed is:

1. A method of updating a plurality of applications on an electronic device from a plurality of content servers through a host device, comprising the steps of:
   providing a plurality of conduits resident on said host device, where each conduit is for servicing a specific application;
   at a time when said electronic device is not coupled to said host device, actuating said conduits for comparing versions of applications and content stored by said host device with current versions of corresponding applications and content residing on said plurality of content servers to determine whether newer versions of such applications and content reside on said plurality of content servers;
   conduits communicating user identification information regarding the electronic device to the content server;
   storing said newer versions from said content server on said host device; and
   at a time when said electronic device is actuated for synchronization, actuating said conduits to extract and install said newer versions from said host device on said electronic device; and
   wherein the newer versions of the applications and content are personalized for the electronic device based on the user identification information.

2. A method according to claim 1 wherein said electronic device comprises a device with a screen.

3. A method according to claim 1 wherein said electronic device comprises a personal digital assistant.

4. A method according to claim 1 wherein said electronic device comprises a palm top computer.

5. A method according to claim 1 wherein said synchronization includes docking said electronic device in a cradle coupled at least to said host device.

6. A method according to claim 1 wherein a content server comprises at least one of the following:
   a remote server computer system;
   a remote computer system; or
   a computer directly connected to said host device.

7. The method according to claim 1, wherein the content server dynamically generates an updated application that is personalized.

8. The method according to claim 1, wherein the user identification information comprises at least one of a name, an address, and previous content interacted with by the user.

9. A system for providing updated applications on an electronic device with reference to a content server, using a host device and comprising:
   said electronic device for providing application information to a user;
   a plurality of conduits resident on said host device, where each conduit is for servicing a specific application where said conduits are actuated by said host device at a time when said electronic device is not coupled to said host device, for enabling comparison of versions of applications and content stored by said host device with current versions of corresponding applications and content on said content server to determine whether newer versions of such applications and content reside on said content server, passing user identification information regarding the electronic device to the content server and storing said newer versions from said content server on said host device; and
   wherein said plurality of conduits further operate when said electronic device is actuated for synchronization, to extract and install said newer versions from said host device on said electronic device and the newer versions of the applications and content are personalized for the electronic device based on the user identification information.

10. A system according to claim 9 wherein said electronic device comprises a device with a display screen.

11. A system according to claim 9 wherein said electronic device comprises a personal digital assistant.

12. A system according to claim 9 wherein said electronic device comprises a palm top computer system.

13. A system according to claim 9 further including a cradle for said electronic device for communication with at least said host device.

14. A system according to claim 9 wherein said content server comprises at least one of the following:
   a remote server computer system;
   a remote computer system; or
   a computer directly connected to said host device.

15. The system according to claim 9, wherein the content server dynamically generates an updated application that is personalized.

16. The system according to claim 9, wherein the user identification information comprises at least one of a name, an address, and previous content interacted with by the user.

* * * * *